United States Patent Office 3,338,345
Patented Aug. 29, 1967

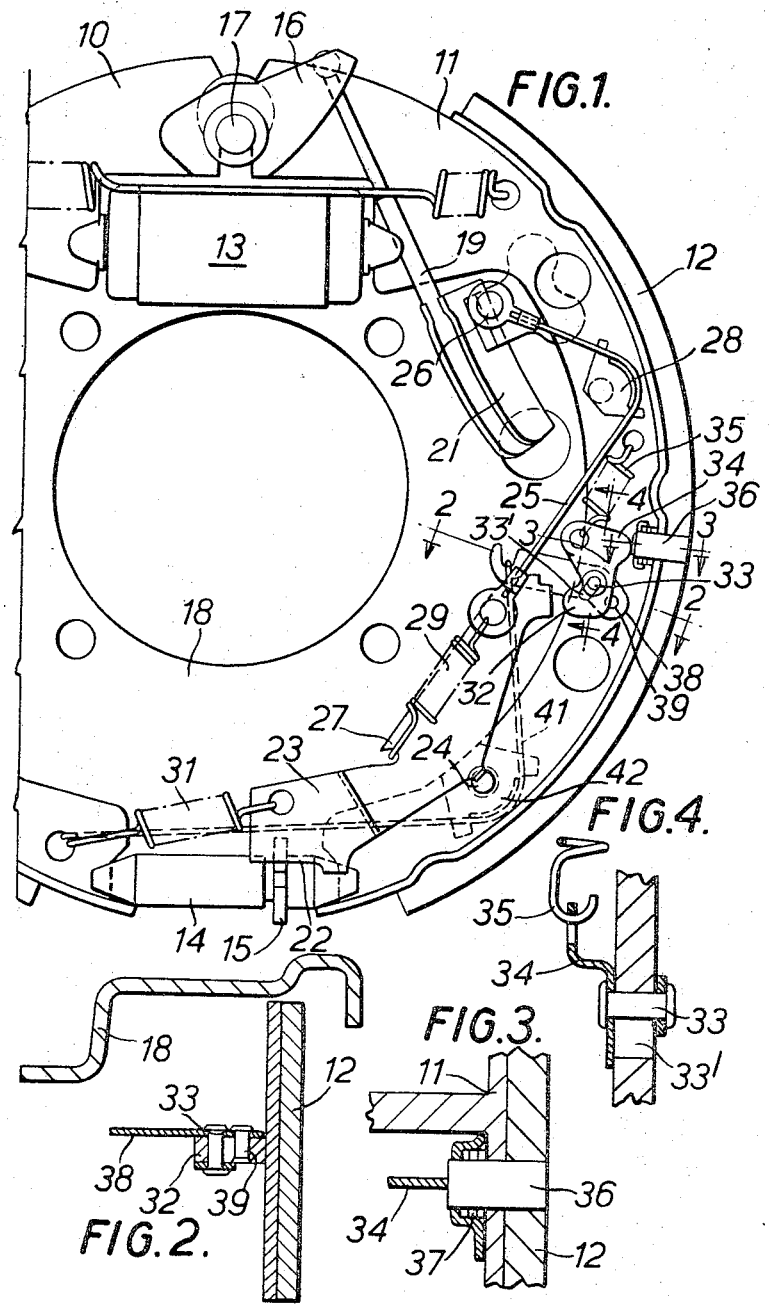

3,338,345
ADJUSTER FOR SHOE DRUM BRAKES
Benjamin Andrew Clay, Stourbridge, and Albert Charles Hill, Birmingham, England, assignors to Girling Limited, Birmingham, England, a British company
Filed Aug. 19, 1965, Ser. No. 480,864
Claims priority, application Great Britain, Aug. 25, 1964, 34,837/64; Nov. 7, 1964, 45,455/64
3 Claims. (Cl. 188—79.5)

ABSTRACT OF THE DISCLOSURE

An adjuster for shoe drum brakes designed to prevent overadjustment in response to temporary brake drum enlargement due to heat or braking force by the provision of a button or plunger which projects radially through an opening in one of the shoes into engagement with the brake drum and is movable inwardly as wear of the linings takes place, the invention which includes a movable stop operably connected to the plunger to be adjustably positioned for an angularly movable lever adapted to actuate ratchet and pawl mechanism for increasing the separation of the brake shoes.

Detailed description

This invention relates to improvements in adjusters for shoe drum brakes of the kind in which at least two arcuate shoes carrying friction linings are movable by actuating means into engagement with a rotatable drum and adjusting means are provided for separating adjacent ends of the shoes to take up wear of the linings.

Numerous forms of automatic adjusters have been proposed but one of the drawbacks of most automatic adjusters is that the adjustment is not independent of deflection or distortion of the shoes or drum or other parts of the structure and over adjustment may take place with consequent binding and over-heating of the brake.

According to our invention, in a shoe drum brake having means for adjustment of the shoes to compensate for wear of the friction linings the extent of the adjustment which can be made after a predetermined amount of wear of the shoe linings is controlled by a button or plunger which projects radially through an opening in one of the shoes into engagement with the brake drum and is movable inwardly as wear of the linings takes place.

Adjustment is effected therefore only on and in direct proportion to actual wear of the shoe lining so that it is independent of deflection of any part of the brake structure.

Where the adjustment is effected automatically the radially movable button or plunger may control the position of a stop for an angularly movable lever actuating ratchet and pawl or equivalent mechanism for increasing the separation of the brake shoes. Alternatively it may control a stop limiting the separation of the shoes by the adjuster.

Two forms of automatic adjuster in accordance with our invention are illustrated by way of example in the accompanying drawings in which:

FIGURE 1 is an end elevation of a brake incorporating one form of adjuster;

FIGURES 2, 3 and 4 are fragmentary sections taken on the lines 2—2, 3—3 and 4—4 of FIGURE 1 respectively;

Figures 5, 6, 7, 8:
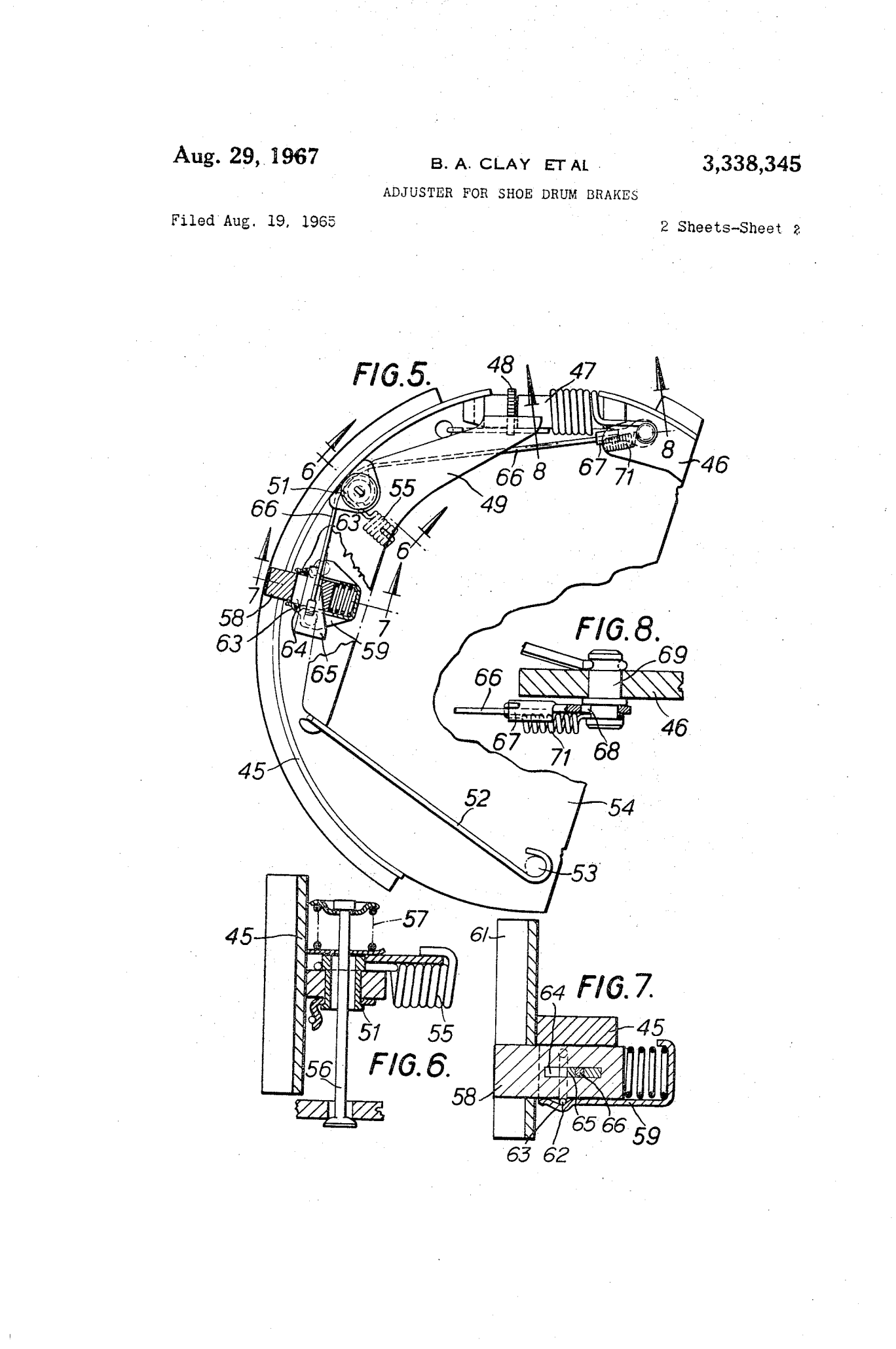

FIGURE 5 is an end elevation of a brake incorporating another form of adjuster; and FIGURES 6, 7 and 8 are fragmentary sections on the lines 6—6, 7—7 and 8—8 of FIGURE 5 respectively.

The brake shown in FIGURES 1 to 4 is of the duo-servo type and incorporates two opposed arcuate shoes 10, 11 carrying friction linings 12 adapted to be brought into braking engagement with a rotatable drum (not shown). The shoes are adapted to be separated at one end by an hydraulic actuator comprising a double-ended hydraulic cylinder 13, and the ends of the shoes remote from the actuator are connected by a strut or thrust member 14 of which the effective length is adjusted by rotation of a part of the strut carrying a ratchet wheel or star wheel 15. The first ends of the shoes are also separable mechanically by a cam 16 angularly movable about a pin 17 which is mounted in the stationary back-plate 18 of the brake and forms a torque-taking anchor or abutment for the shoes. The cam is actuated from a hand-lever or the like by a cable 19 which is carried round a quadrant 21 pivotally mounted on the back-plate.

The ratchet wheel 15 is engaged by a pawl tooth or equivalent part 22 on one end of a lever 23 extending in a generally circumferential direction on one side of the web of the shoe 11, the lever being pivoted about the middle of its length on the shoe web by means of a tongue on the lever engaging in an opening 24 in the web. Angular movement of the shoe is detected by a cable 25 attached at one end to a stationary anchorage 26 on the mounting of the quadrant 21 and at the other end to a hook 27 on the inner edge of the lever at a point between the pivot 24 and the pawl. The cable is carried round an arcuate guide 28 on the shoe web and incorporates in its length a tension spring 29 which can yield under excessive load.

The end of the lever carrying the pawl 22 is connected by a return spring 31 to the web of the shoe 10 or to an anchorage on the back-plate.

The end of the lever remote from the pawl co-operates with but is normally spaced at a predetermined distance from a stop formed by one arm 32 of a bell-crank lever pivoted on a pin 33 in the shoe web about the middle of the length of the shoe. The other arm 34 of the lever is held by a spring 35 in engagement with the inner end of a radial plunger 36 movable against frictional resistance provided by a closely coiled spring 37 through an opening in the shoe flange and the friction lining 12, the outer end of the plunger being flush with the surface of the lining. The pin 33 about which the bell-crank lever pivots is movable in an inclined slot 33' in the shoe web and the position of the pin is controlled by a re-setting lever 38 pivoted at 39 in the shoe web.

The free end of the lever 38 is connected by a cable 41 to the web of the shoe 10, the cable being carried round a guide 42 associated with the lever pivot.

Normally when the brake is applied the outward movement of the shoe 11 tensions the cable 25 to rock the lever 23 angularly about its pivot, but the lever engages the stop 32 before its angular movement is sufficient to cause the pawl 22 to ride over a tooth on the ratchet wheel 15.

When a certain amount of wear of the friction linings has taken place and the brake is applied the plunger 36 is forced inwardly and moves the bell-crank lever angularly to increase the clearance between the lever and the stop 32. If the clearance is then sufficient the pawl 22, on application of the brake, will ride over one or more teeth on the ratchet wheel and on release of the brake the return spring 31 moves the lever back and the pawl rotates the ratchet wheel 15 to increase the effective length of the strut or thrust member 14.

The normal clearance between the lever and the stop 32 is restored by the re-setting lever 38 which is connected by the cable 41 to the shoe 10, the increase in the separation of the shoe ends moving the pivot of the bell-crank lever along the slot in the web of the shoe 11.

It will be appreciated that adjustment is effected only on and in direct proportion to actual wear of the friction lining of the shoe 11 so that it is independent of deflection of any part of the structure.

The brake shown in FIGURES 5 to 8 is also of the duo-servo type, the ends of the shoes 45, 46 remote from the actuator (not shown) being connected by a strut 47 of which the effective length is adjustable by rotation of the part of the strut carrying a ratchet wheel 48. The ratchet wheel is engaged by one end of an adjusting lever 49 pivoted at 51 on the web of the shoe 45, the other end of the lever being connected by a link 52 to a stationary anchorage 53 on the back-plate 54 of the brake. The pivot 51 for the lever comprises a headed sleeve fixed in the shoe web, and a notch in the outer edge of the lever is held in rocking engagement with the sleeve by a spring 55 as shown more particularly in FIGURE 6. A pin 56 loaded by a spring 57 passes through the sleeve to urge the shoe towards the back-plate.

This method of mounting the lever ensures that when the resistance to movement of the lever exceeds a value determined by the loading of the spring 55 the shoe can move outwardly independently of the lever and no undue force can be applied to the lever by the shoe.

A radially movable button or plunger 58 is slidably mounted in a housing 59 secured to the web of the shoe 45 about the middle of the length of the shoe.

The outer end of the button or plunger projects through an opening in the shoe flange or platform and the friction lining 61 for engagement with the brake drum, the outer end of the button being flush with the outer surface of the lining. Between the shoe flange and the housing the button extends through a one-way clutch formed by a spring ring 62 and a coned sleeve 63 to prevent outward movement of the button in the housing.

A transverse slot 64 in the button has an inclined inner edge, and a flat wedge 65 extends through this slot and through guiding slots in the housing. A cable 66 is attached at one end of the wedge and at the other end is attached to an end fitting 67 having a slot 68 engaging over a peg 69 fixed in the web of the shoe 46 adjacent to the end of the web engaging the strut 47. The fitting 67 is loaded by a spring 71 connected between the peg and the fitting and applying a pull to the cable 66 in a direction tending to pull the wedge through the button. Between its ends the cable 66 is carried round a guide on the first shoe 45 which may be the sleeve part of the pivot 51 for the lever as shown.

Initially the end of the slot 68 in the end fitting 67 remote from the first shoe 45 is in engagement with the peg 69. The frictional resistance to inward movement of the button 58 is such that the spring 71 cannot pull the wedge 65 through the button, but as wear of the shoe lining takes place the button is forced inwardly on application of the brake. The wedge can then be drawn through the button to an extent dependent on the lining wear so that a gap or clearance is established between the peg 69 and the end of the slot 68 in the end fitting 67 remote from the shoe 45. This permits separation of the shoe ends by the adjuster through a distance equal to that gap or clearance.

In a brake of the duo-servo type the angle of the wedge is selected in accordance with the spacing of the button from the stationary anchor pin for the shoes and also depends on whether the button is mounted in the primary or secondary shoe. If the button is located adjacent to the centre of a shoe, which is the point at which maximum wear of the shoe lining takes place, a given amount of lining wear requires an adjustment of the shoe end equal to twice that amount.

Wear of the secondary shoe lining takes place at a greater rate than wear of the primary shoe lining. If the primary shoe wear is equal to $y$ the required adjuster movement to take up that wear is $2y$, and if the secondary shoe wear is equal to $x$ the required adjustment movement to take up that wear is $2x$, so that the total adjuster movement required is $2(x+y)$.

If the button is mounted in the secondary shoe the wedge angle is given by the formula $$\text{Tan} \frac{x}{2(x+y)}$$

while if it is fitted to the primary shoe the wedge angle is given by the formula $$\text{Tan} \frac{y}{2(x+y)}$$

Our improved control for brake adjustment can also be employed where the adjustment is effected manually.

We claim:
1. A shoe drum brake for vehicles comprising complementary first and second shoes carrying friction linings for engagement with a rotatable drum, means for separating the shoes to compensate for wear of the friction linings, an adjusting lever pivotally mounted on said first shoe and actuating said means on angular movement of the lever relative to the shoe, a movable stop limiting angular movement of the lever, and a radially movable plunger extending through an opening in said first shoe and its friction lining for engagement with the drum, said plunger engaging said stop and moving it to permit increased angular movement of the lever as the plunger is moved inwardly by the drum on application of the brake after wear of said lining has taken place.

2. A shoe drum brake as in claim 1 wherein said stop comprises a bell-crank lever pivotally mounted on said first shoe, one arm of the bell-crank co-operating with the adjusting lever and the other with said plunger.

3. A shoe drum brake for vehicles comprising complementary first and second shoes carrying friction linings for engagement with a rotatable drum, means for separating the shoes to compensate for wear of the friction linings, a radial plunger extending through an opening in said first shoe and its lining and movable inwardly against frictional resistance by the drum on application of the brake after wear of the friction linings, a transverse slot in said plunger, an inclined inner edge to said slot, a wedge extending through said slot, a peg on the second shoe, a fitting having a slot engaging over said peg, a flexible tension member connecting said wedge to said fitting, and a spring acting on said fitting in a direction tending to pull said wedge through said slot in the plunger, said fitting and peg limiting separation of the shoes.

References Cited

UNITED STATES PATENTS

| 2,002,139 | 5/1935 | Des Rosiers | 188—79.5 |
| 2,322,061 | 6/1943 | Schnell | 188—79.5 |
| 2,592,326 | 4/1952 | Page | 188—79.5 |
| 2,838,139 | 6/1958 | Des Rosiers | 188—79.5 |

DUANE A. REGER, *Primary Examiner.*